United States Patent Office 3,359,123
Patented Dec. 19, 1967

3,359,123
PROCESS OF DEHYDRATING POTATOES
George A. Katucki, Nanuet, and Augustine D. D'Ercole, White Plains, N.Y., and William J. Howley, Ramsey, N.J., and Dominic A. Alia, Yonkers, N.Y., assignors to General Foods Corporation, White Plains, N.Y., a corporation of Delaware
No Drawing. Continuation of application Ser. No. 200,-920, June 8, 1962. This application June 3, 1966, Ser. No. 555,934
16 Claims. (Cl. 99—207)

The present application is a continuation of S.N. 200,-920, filed June 8, 1962.

This invention relates to quick-cooking dehydrated potatoes. More particularly this invention relates to a process for the manufacture of dehydrated potato pieces of any desired size which can be rapidly reconstituted to the flavor and texture of freshly cooked potatoes.

While it has been attempted to produce dehydrated potato pieces of various sizes, these attempts on the whole have been unsuccessful with the exception of vitreous, thin sliced, small diced, or granulated products having limited recipe uses and poor rehydration qualities. On the other hand, substantially larger pieces of potatoes, such as whole potatoes, potato chunks, and large slices of potatoes have not been successfully produced due to the unique and difficult dehydration problems involved. Especially is this true in the case where the processed potatoes are to be dehydrated by drying in air, which is the cheapest manner of dehydration, and the most feasible from a commercial standpoint.

Prior art processes have recognized the advantages of a controlled freezing cycle after cooking to form a porous sponge-like potato product which can then be dehydrated in air. However, these processes have not so far as is presently known dealt with any critical prerequisite for cooking potato in a heating medium which has a critical moisture content under mild gelatinization conditions, nor have such processes related the heating conditions to the freezing and drying steps.

Such prior art patents as United States Patent No. 2,490,431 issued Dec. 6, 1949, to John W. Greene et al. and No. 2,564,296 issued Aug. 14, 1951, to Bertram R. Bostock disclose the cooking and freezing of unpeeled potatoes prior to producing a powderous potato product. These processes, however, do not recognize that many important advantages may be derived by a controlled cook wherein the skins or jackets are left on the potatoes as a protective covering in order to preserve the cellular potato structure. These patents indicate that potatoes may be heated and processed in an unpeeled state, but this is purely from an economical standpoint which is not critical to the process. In the Greene et al. patent, the potatoes are cooked under conditions which destroy the cellular structure of the potato, frozen, peeled, and then dried and processed to a granulated form. The process is not suitable for the production of dehydrated potato pieces of any substantial size since the cellular integrity of the potato is destroyed. Similarly, the Bostock patent cooks and freezes unpeeled potatoes under conditions which destroy the cellular potato structure in order to obtain a mashed potato product. These patents are representative of the prior art which has so far been unsuccessful in producing a dehydrated potato product of any substantial size, which product retains its cellular structure, identity and textural quality.

This invention is founded upon the discovery that unpeeled, whole potatoes may have their starch cells gelatinized to a swollen, but substantially unruptured state, by cooking under atmospheric conditions which avoid additional moisture pick-up by the potato as well as a deterioration or breakdown in the cellular structure of the potato and render the potato more amenable to freeze-thawing procedures. The whole, unpeeled, and partially gelatinized potatoes are then subjected to a freezing step wherein the potatoes are cooled to their freezing point to initiate freezing of the potatoes and maintained at this freezing point until the entire cellular structure of the potato is frozen into an expanded form which will become porous, and sponge-like in texture upon thawing from its frozen state. The frozen potatoes are then peeled, thawed and subjected to a dehydration step which reduces the moisture content of the potatoes to a stable level without disturbing the cellular structure or sponge-like texture of the potato product.

Large dehydrated pieces of potato such as whole potatoes and potato chunks as well as small slices may be rapidly rehydrated and reconstituted to a boiled potato texture and taste in water which is at boiling temperature or below boiling temperature, typically 180°–212° F., in a matter of about 10 minutes. The reconstituted product has a uniform boiled potato-like texture and flavor and is suitable for use in a wide variety of potato recipes. If the particular recipe requires further heating of the potato, the rehydration time can be reduced to a matter of minutes, say 3 to 7 minutes, and this rehydration may be carried out in cold or warm water.

In practicing this invention raw unpeeled potatoes are washed, graded according to their size and then subjected to the first critical step of the process, namely the cooking under limited moisture conditions. The controlled cook or partial gelatinization is conducted under heating conditions which avoid any pick-up of moisture during gelatinization. Essentially, cooking is carried out at elevated temperatures under non-condensing atmospheric moisture conditions which maintain the potato at a sufficiently high temperature to gelatinize the potato while avoiding any substantial condensation of water on the potatoes being cooked. For most operations the relative moisture of the heating air should therefore be below 100% or the saturation point of the heated air. The unpeeled potatoes are heated preferably under substantially dry conditions, typically below 30% relative humidity, with a draft of air having a temperature of less than 200° F., say 175° F. During the heating cycle the internal potato temperature should never exceed 180° F. and should be preferably within the range of 155° to 175° F. during the partial gelatinization process. All the temperatures recited herein are dry bulb temperatures wherein the relative humidity is below 100%.

The controlled cooking and partial gelatinization should be performed under conditions which avoid moisture pick-up by the potato, and preferably under conditions where the potato loses a minor proportion of its original moisture content. Therefore, the potatoes are cooked in an unpeeled state, that is, with their skins or peel portions substantially unremoved. However, several of the outermost layers of the potato epidermis may be removed incident to a gentle abrasion during preliminary washing. The cooking proceeds at a rate which avoids a temperature within the potato in excess of 180° F., the preferred maximum internal potato temperature during cooking not exceeding 175° F., and the optimum potato temperature being in the neighborhood of 170° F. During cooking the desired potato temperature should be retained for a sufficient period to effect a partially gelatinized state wherein the starch molecules assume a swollen but unruptured state, such as exists in a cooking period of 30–60 minutes, typically 45 minutes. This cooking operation is further characterized by a gradual heat transfer accomplished by means of a controlled heat source which avoids condensation of water on the potato surface during the cooking. The heating means may take the form of a dry air oven, dry air forced-draft heating on a belt dryer, a vacuum-steam chamber, and other similar devices. Whatever the means employed, the cooking operation will essentially involve elevating the internal potato temperature to a requisite level, say 165°–175° F., whereat partial gelatinization may proceed at a controlled rate. The gelatinization process then proceeds for about 30–60 minutes without exceeding the aforestated maximum internal potato temperature of 180° F. The cooking operation should avoid the excessive cooking effects created by the more conventional cooking operations involving the heating of potatoes in an excess of moisture, such as by immersing the whole potatoes in boiling water, or by cooking the whole potatoes with excess steam which condenses into free water on the potato surface.

The presently preferred method for carrying out this cooking operation involves subjecting the cold, washed, graded and substantially unpeeled potatoes to a forced draft of hot air, having a typical relative humidity of less than 40%, say 10% to 20%, in two separate stages. In the first stage, air at a temperature in the neighborhood of 190° F. or slightly higher (depending upon the rate of circulation of the air, the capacity of the oven, the size of the oven, and the charge of the potato in the oven) is circulated about the potatoes for a period of time sufficient to elevate the temperature of the potatoes to the aforestated maximum internal potato temperature range of not more than 180° F. and preferably 160–170° F. Thereafter, the second phase of the potato cooking operation proceeds for a period of 30–60 minutes while keeping said temperature relatively constant, the internal potato temperature never exceeding 180° F. In the first heating stage, cooking proceeds at a gradual rate until the internal potato temperature reaches the gelatinization range of 155°–180° F., preferably about 165° F. at which temperature the second phase of the cooking operation is carried out by using a forced draft of hot, dry air at a temperature below 190° F. and usually in the neighborhood of 170°–185° F. In any event, the internal potato temperature must be maintained below 180° F. throughout the second stage of the cooking operation so that the requisite degree of partial gelatinization is achieved while keeping the cellular structure of the potato intact. A preferable temperature range for the second stage of cooking is 165° to 170° F. By this manner of cooking the cells of the potato will experience no cell deterioration or mushiness during the heating and the unpeeled potato will not undergo a drastic loss in potato moisture. The potatoes will in fact retain a major proportion of their moisture, the weight loss of the potatoes after the cooking operation usually never exceeding 25% and commonly having a weight loss in the neighborhood of 5 to 20%, typically about 13%. During this cooking operation the appearance of the skin will appear substantially unchanged from that of raw unpeeled whole potatoes except for some wrinkling of the skin due to slight shrinkage in the potato mass.

After this cooking operation the whole potatoes with the skin portions thereon are subjected to a sponge-forming freeze operation which greatly increases the porosity of the potato. Freezing is accomplished by pre-cooling the potatoes to 30° F. and then maintaining the potatoes at their freezing or crystallization plateau wherein the internal potato temperature is at 30° F. for a sufficient period of time to form a sponge-like porous product. The sponge-like texture of the final potato product can be varied by changing the residence time at which the potatoes are kept at the freezing plateau. This period will vary from several minutes to several hours depending on the final texture desired in the end product and the size of the potato piece. For small slices of potato (½" x ½" x 2½")

a holding period at the plateau of 15 to 60 minutes is suitable, for transverse potato slices or chunks of potatoes of ⅝" thickness 60 to 100 minutes is suitable, while for whole potatoes having a length of 3 to 6" 1 to 8 hours is usually required.

Freezing may be carried out by a variety of methods. Indeed, even immersion freezing, that is, immersing the potato in a refrigerated liquid or brine having a temperature of about −30° to +30° F. may be used with advantage. However, in the case of immersion freezing it is deemed essential that the refrigerating liquid be incapable of producing such a rapid reduction in temperature as to prevent the formation of the gradual and uniform sponge-like structure within the potato tissue. Therefore, in the case of immersion freezing, the refrigerant should be a type of liquid such as is capable of maintaining a temperature in the neighborhood of −30° F. or higher, typically about 0° F. Freezing temperatures of −30° F. or lower are contemplated only as practical for decreasing the precooling time or the time for lowering the internal potato temperature to 30° F., at which temperature the formation of the porous sponge-like cellular texture within the potato begins. This may occur in as short a period of time as several minutes by dipping the potatoes in a volatile liquid refrigerant having a low boiling point. However, it is realized that regardless of the refrigerant employed, the rate of precooling to the freezing temperature of the potato is limited more directly by the heat conductivity or heat transfer of the potato, itself.

In all this discussion, it is realized that the completion of the freezing step is accomplished at the internal potato temperature or freezing plateau of 30° F. and this step may be preferably carried out in a freezing room which holds the internal temperature of the potato at a 30° F. plateau for the requisite period of time. The crystallization plateau of 30° F. is maintained very suitably by an air temperature of 20° to 30° F. The freezing operation may involve any liquid or gaseous means of effecting a heat transfer such as carries out the promotion of the sponge-producing conditions alluded to above.

Essentially, the cooked potato is subjected to a substantial reduction in temperature sufficient to cause crystallization of the moisture as well as a change in the starch form of the potato. The freezing condition thus produced will create the forerunner of a "sponge" upon thawing of the potato, which sponge upon thawing is preferably subjected to a soaking step as will be described more particularly hereinafter. Thus, the cooked unpeeled potatoes are subjected to an internal potato temperature of about 30° F. and held at this freezing or crystallization plateau until the desired texture is achieved.

The rate or period of time at which the potato is frozen at the crystallization plateau will have a direct bearing upon the graininess of the final dehydrated product as well as its porosity and texture. Potatoes have been frozen at various temperatures ranging from those prevailing at −30° F. to 30° F. with varying effects upon textures. It is also within the spirit of the present invention that the potato may be rapidly pre-cooled and then frozen by means of a liquid refrigerant such as a brine solution. Pore size or graininess of the potato product will be a function of the rate of freezing generally and, more particularly, of the residence time of the cooked potato at the 30° F. plateau. Generally, in a fast freezing operation a very fine sponge having small pores is produced, which sponge upon dehydration provides a less grainy potato product upon rehydration. On the other hand, at such a rapid freezing rate the potato sponge piece ultimately dehydrated will call for a much longer drying period. Conversely, in a slow freezing operation, that is, one wherein the cooked potato is maintained at the 30° F. plateau for a protracted period (say in excess of 8–10 hours before further reduction in potato temperature) a more porous and grainier potato texture is ultimately produced in the sponge resulting in a product which when subjected to dehydration calls for a significantly shorter drying time but which may produce a product having a less preferable rehydrated potato texture. In this connection, the texture of the potato sponge will therefore be found to be primarily a function of the residence time of the potato at the 30° F. internal potato temperature or freezing plateau, and it is a preferred practice of the present invention to carry out the freezing operation under such conditions as allow the potato to have a residence time at 30° F. sufficient to effect a uniform ice crystal growth throughout the potato mass. This residence period is usually in the neighborhood of 15–100 minutes for most potato pieces. For small slices suitable for French fries and hash browns the residence time is about 20–45 minutes while for whole potatoes and potato halves the residence freezing time is in the range of 1 to 8 hours.

Preferably, the cooked potatoes are pre-cooled rapidly in 1 to 10 minutes from an internal potato temperature of about 80°–100° F. to an internal freezing temperature of 30° F. It is believed that a rapid reduction in potato temperature, initiates a more proper formation of starch and water crystallization. Therefore, the cooked potato should be pre-cooled to the aforestated plateau in a period of less than 1 to 2 hours, and more preferably in a period of minutes, and then frozen at the crystallization plateau for a suitable residence time to give a product having a most acceptable smooth texture.

In accordance with one embodiment of the invention, the cooked potato may simply be placed in a freezing chamber having an ambient air temperature of 0° F. and allowed to reside therein for a period in the neighborhood of 5 to 10 hours during which time it will be found that the cooked potato will stay at the aforesaid plateau for a period of 45–70 minutes after reaching its freezing plateau or internal potato temperature of 30° F. in about 30 minutes. On the other hand, in accordance with a more practical aspect of the present invention involving the use of a tunnel or blast freezer to accelerate the freezing operation, the potato will undergo a rapid reduction in temperature at an air temperature of −20° F. to the aforestated internal potato temperature plateau of 30° F. in about 10–20 minutes, and then will be maintained at this plateau for the requisite period of time after adjusting the air temperature to 20° F.

It is believed that the sponge-forming conditions of the freezing operation must be practiced which result in a uniform ice crystal growth being promoted as uniformly as possible throughout the cross-section of the potato. Therefore, it is important that these ice crystals be produced slowly and gradually after the potato has reached an internal potato temperature of 30° F. and, consequently, cause an expansion of the potato tissue thereby controlling pore size. The crystal growth of the ice crystals formed should be larger than the tiny crystals formed by instant freezing methods which use such liquid refrigerants as liquid nitrogen and liquid nitrous oxide. These liquids have boiling points in the range of − 332° to −120° F. at atmospheric pressure and are not suitable for keeping the potatoes at the freezing plateau for the requisite period of time.

After freezing the potato is subjected to a peeling operation. Peeling may be carried out by any conventional means, such as by abrasion, or brush peeling of the frozen potato. Brush peeling easily removes all of the frozen peel. Likewise, lye or steam peeling may be used. All of these means are adequate to assure the removal of the jacket or peel portion of the potato. It is a feature of this invention that the frozen potatoes need not be thawed prior to peeling but may be directly peeled after removal from the freezing zone.

The peeled potato may now be subjected to a cutting operation while still in a frozen state or may be thawed prior to cutting. Thawing is preferably carried out by immersing the potato in room temperature water. The cut potatoes may be relatively large in size, or small in size. The pieces may be sliced, diced or cut into any desired form. However, it is a particular feature of this invention that potatoes may be cut into large pieces which may be effectively dehydrated and then reconstituted to a texture, flavor and quality similar to freshly cooked potatoes. The preliminary soak prior to cutting may of course include various additives such as antioxidants, texturizing and/or flavoring ingredients.

The potatoes are then preferably subjected to a prolonged soaking step in an aqueous liquid. The soaking step serves to improve the rehydration characteristics of the final product. This soaking results in only a moderate increase in the moisture content of the potato (say in the neighborhood of 5%). As a result of this soaking, residual ice crystals melt leaving a sponge-like texture of potato mass containing expanded potato tissue with accompanying channels for both the egress and ingress of moisture whereby dehydration as well as rehydration are facilitated.

Incident to such thawing or soaking step will be the practice of employing a preservative or antioxidant treating agent, such as a sodium meta bisulphite or other soluble $SO_2$ containing salt solutions, which will inhibit the tendency for the dehydrated product to brown and develop off-flavors. By virtue of the creation of the channels and the ready ingress of moisture into the potato interstices during soaking, such treating agents as the bisulphite, effectively penetrate the interior of the cooked potato mass as well as the surface thereof. In this manner the dehydrated potato product has the required protection necessary for prolonged storage. Likewise, in addition to the bisulphite treatment specified above, other agents such as are capable of arresting the browning tendencies and other oxidative phenomena experienced during packaging of the dehydrated product may be employed. For example, such antioxidants as the butylated hydroxyanisole or butylated hydroxytoluene type compounds, as well as other water insoluble antioxidants, may be sprayed on the product after dissolution in an alcohol. This antioxidant spray may follow the soaking operation. Also, it is entirely within the scope of the present invention that flavoring components and other treating agents such as may be functional to either enhance the storageability or protectability of the final dehydrated product as well as the palatability of the rehydrated product may be employed. Generally, the soaking step will require a period of several minutes, say 5–15 minutes, for infusion of the treating constituents. However, the invention is not to be restricted to the use of a soaking operation and it is entirely within the scope of the present invention that in lieu of soaking the potato may simply be allowed to thaw at ambient temperatures. The degree of thawing and the period employed as well as the means to effect the melting of the ice crystals in the sponge-like mass produced upon thawing of the ice will be dictated to a large extent by the particular form of the cooked potato. The potato may be whole potato, potato chunks, slices, dice, chips or other suitable forms.

Ultimately the sponge-like potato product is subjected to dehydration under such temperature conditions as avoid any extensive further gelatinization of the potato pieces, deterioration of the sponge-like cellular structure, or any undue charring of the product. Preferably, dehydration will be carried out in a forced draft hot air chamber which removes the moisture content of the product and carries it down to a stable moisture of below 10%. The method of drying should be such that the structural identity of the potato is preserved. In the case of drying in air, it has been found that air temperatures of less than 190° F. should be employed. For whole potatoes drying air temperatures of 170° F. for about 10 hours is suitable, for large potato pieces or chunks of potatoes a drying air temperature of 120° F. for about 14 hours is suitable, for small slices suitable for French fries a drying air temperature of 170° F. for 2 hours is practical, while for potato chips a drying time of 2 hours at an air temperature of 140° F. is suitable. Various means for dehydration may be used provided temperatures and other conditions are observed whereunder excessive cooking or other disturbance of the partially gelatinized state of the potato is minimized or avoided. Advantageously, it has been found that humidified air drying is preferable, the drying chamber typically containing 20–40% relative humidity. It is due to the sponge character of the potato pieces that they are capable of being dried under relatively mild drying temperatures in a period of several hours. The rate of dehydration is dependent upon the particular porosity of the sponge-like mass and the size of the potato pieces. As indicated previously, this sponge-like porosity is a function of the rate of freezing at the crystallization or freezing plateau, and this freezing rate may be adjusted so as to be concomitant with potato texture requirements.

The dehydrated product will be found to be reconstitutable in water which is at its boiling point or below its boiling point, say 180°–212° F. Typically, a potato piece having as one of its dimensions a thickness in the neighborhood of ⅝-inch can be placed in cold water which is brought to a boil and which will be allowed to boil for 4–6 minutes, the potato piece can then be removed from the boiling water, drained and will be readily to eat as a boiled potato. Should the potato be intended for use in preparation of a cold salad, it can be chilled, further sliced if desired, and suitably seasoned with other ingredients to give a sliced potato which will be similar to the freshly prepared product.

The dehydrated potato products of the present invention are noteworthy for their flexibility to various recipes. Thus, the dehydrated potato product may be rehydrated, preferably in boiling water, which rehydration will take place in a period of from 5–10 minutes depending upon the dimensions of the piece, whereafter the piece is removed from water and is drained and then may be fried in a matter of 2–3 minutes through immersion in a hot vegetable oil. The French fried product thus produced is quite acceptable and has a crisp outer skin and a mealy readily masticatable center.

While the foregoing discussion of the potato and its advantages has been in the main concerned with a product which is readily rehydratable and in the process convertible to a cooked boiled potato texture or a fried potato texture, it is understood that the dried product is admirably suited to other uses wherein the recipe does not call for as high a degree of rehydration. For example, a potato piece in the form of a thin slice, such as ¼-inch or ½-inch, which piece can be rehydrated in cold water in 2–3 minutes can then be used in various recipes such as a potato casserole, au gratin potatoes, scalloped potatoes, roasted potatoes, pan fries, etc.

The invention will now be more fully described by reference to the following specific examples.

*Example 1*

A batch of ordinary Idaho russet potatoes was washed and graded according to size. The potatoes were then heated in air having a temperature of 195° F. and a relative humidity of less than 30% for about 50 minutes to raise the internal potato temperature to 172° F. The potatoes were then held at an internal potato temperature of below 175° F. by maintaining the surrounding air temperature at 170° F. and a relative humidity of less than 10% for about 45 minutes to form a partially gelatinized cellular structure throughout the whole potato. During this cooking step the cells of the potato remained intact, and the potatoes exhibited no sign of structural breakdown or mushiness. Moisture loss during heating was about 15%. The temperature of the partially gelatinized potatoes was then reduced to 80° F. by cooling in room temperature for about 30 minutes. The potatoes were then rapidly precooled to an internal potato temperature of 30° F. in about 30 to 60 minutes by being placed in a blast freezer having an air temperature of −20° F. The potatoes were kept at the crystallization plateau of 30° F. about 6 hours. After 6 hours the potatoes exhibited a completely frozen, sponge-like cellular structure throughout the potato. The frozen potatoes were then further cooled for about 60 minutes at a temperature of −20° F. in order to reduce the internal potato temperature to about −27° F. to thus assure completion of the freezing cycle. The unpeeled potatoes were then subjected to a conventional brush-peeling operation in order to remove the skins, eyes and blemishes parts of the potato. The whole potatoes were then immersed or soaked in an aqueous solution containing about 0.5% of sodium meta bisulphite solution for about 60 minutes. The soaking step was found to give an improved porosity as evidenced by widened channels of rehydration in the potatoes. The whole potatoes were then dried in air at an air temperature of about 170° F. for 10 hours in order to reduce the moisture content of the potatoes to approximately 5%.

The dehydrated whole potatoes were capable of rehydration in about 10 minutes in boiling water and could be used in a conventional baked potato recipe at normal oven temperature. Alternatively the dehydrated whole potatoes could be reconstituted in about 20–30 minutes in water at a temperature of 180°–212° F. to produce a boiled potato having a texture, taste and other qualities similar in all respects to potatoes cooked by the normal household recipe. The reconstituted potatoes were adaptable to any of the varied uses to which boiled potatoes could be applied.

*Example 2*

The procedure of Example 1 was followed except for the freezing step. The potatoes were pre-cooled rapidly by cooling in a blast freezer having an ambient air temperature of −30° F. About 30 minutes were required for the potatoes to reach an internal potato temperature of 30° F. The blast freezer's ambient air temperature was then increased to 28° F. and the potatoes were kept at the freezing plateau for 100 minutes to form a sponge-like porous texture throughout the potato product. The potatoes were then sub-cooled by adjusting the blast freezer temperature to −20° F. for 10 minutes. The potatoes were then peeled, cut into slices of ⅝-inch thickness and soaked for 10 minutes in a dilute sodium meta bisulphite bath (0.3% concentration). The potatoes were then dried in air at a temperature of 125° F. for 13 hours to reduce the moisture level of the potato pieces to about 3%.

The potato pieces were reconstituted to an edible consistency in about 10 minutes in water at a temperature of 180°–212° F. The reconstituted potatoes had a taste, texture, mouthfeel and other qualities similar to potato pieces prepared by the conventional household cooking method and were suitable for use in all recipes wherein boiled potato pieces are used. Potato pieces to be used in a recipe calling for further heat treatment, such as a potato casserole, were rehydrated for only 3 minutes in cold water prior to the final cooking operation while still giving a desirable potato texture.

*Example 3*

The procedure of Example 2 was followed except for the freezing step wherein the unpeeled potatoes were immersed in a conventional brine (NaCl) freezing solution having an ambient temperature of about 25° F. The potatoes reached their freezing plateau in about 50 minutes and were then maintained at this plateau for about 100 minutes. The potatoes were then peeled, partially thawed by immersion in an aqueous sodium meta bisulphite (0.5% concentration) bath for one hour, cut into transverse slices or potato chunks of ⅝-inch thickness and soaked for 10 minutes in a dilute sodium meta bisulphite bath (0.5% concentration). The potatoes were then dried in air at a temperature of 120° F. for 14 hours. The potato pieces reconstituted similarly to the product of Example 2.

*Example 4*

The procedure of Example 2 was followed except that vacuum-steam was used as a heating medium instead of dry air. Steam having a temperature of 212° F. was injected into a vacuum chamber having 20 inches of mercury vacuum. The temperature of the steam in the vacuum was thus lowered to 180° F. and no condensation of free water occurred on the potato surface during cooking Heating was continued for 50 minutes to partially gelatinize the potatoes at an internal potato temperature of about 170° F. The potatoes were further processed according to Example 2 to give a dried product similar in all respects to the product of Example 2.

*Example 5*

The procedure of Example 2 was followed except for the cooking step. The potatoes were frozen similar to Example 2 and kept at the plateau for 30 minutes. They were then peeled, thawed, and cut into sections suitable for French fries (½" x ½" x 2½"). The potatoes were then subjected to a 5 minute soak in a dilute sodium meta bisulphite bath (0.3% concentration) and dried in air at a recirculation air temperature of 120° F. for 3 hours. The dried slices were then rehydrated in cold water for 3 minutes at room temperature and deep-fat fried in 2 to 3 minutes at 390° F. to give a final product similar in all respects to conventional French fried potatoes.

While this invention has been described by reference to specific operative examples it is intended to be limited only by the scope of the appended claims.

What is claimed is:
1. A process for dehydrating potatoes which comprises:
 (a) partially cooking raw, whole potatoes with their skins substantially unremoved in an atmosphere having a relative humidity less than 100% and an ambient temperature such that the internal temperature of the potato does not exceed about 180° F. for a period of time such that the starch molecules in the potatoes swell but are substantially unruptured,
 (b) freezing the partially cooked potatoes under conditions such that the internal potato temperature is held at about 30° F. until the entire cellular structure of the potatoes is frozen,
 (c) drying said potatoes to a moisture content of less than about 10% by weight.
2. The process of claim 1 wherein the potatoes are thawed prior to drying.
3. The process of claim 2 wherein the maximum internal potato temperature during the cooking step is about 155–175° F.
4. The process of claim 2 wherein the potatoes are cooked by means of hot air having a relative humidity of less than 40% and a maximum temperature of about 200° F.
5. The process of claim 2 wherein the cooking time of the potatoes is 30–60 minutes.
6. A process according to claim 2 wherein the potatoes are held at their freezing plateau for a period of about 15 minutes to about 8 hours.
7. A process according to claim 6 wherein the potatoes are precooled to said freezing plateau in a period of less than 1 to 2 hours.
8. A process according to claim 2 wherein the potatoes are peeled prior to thawing.
9. A process according to claim 2 wherein the potatoes are thawed by immersing them in an aqueous bath.
10. A process according to claim 9 wherein said aqueous bath contains a preservative.
11. A process according to claim 2 wherein the potatoes are dehydrated by subjecting them to air having a temperature of less than 190° F. and a relative humidity of about 20–40%.
12. A process for dehydrating potatoes which comprises:
 (a) partially cooking raw whole potatoes with their skins substantially unremoved for about 30 to 60 minutes in an atmosphere having a relative humidity of less than about 40% and an ambient temperature such that the internal temperature of the potatoes does not exceed 180° F.,
 (b) cooling said potatoes to their freezing temperature in a period of time of less than about one to two hours,
 (c) maintaining said potatoes at this temperature until the entire cellular structure of the potatoes is frozen,
 (d) removing the skins from said potatoes,
 (e) thawing the frozen potatoes, and
 (f) drying the peeled, thawed potatoes to a moisture content of less than 10% by weight.
13. A process according to claim 12 wherein the potatoes are thawed by immersing them in an aqueous liquid.
14. A process according to claim 13 wherein said aqueous liquid contains a preservative.
15. A process according to claim 12 wherein the potatoes are dried by subjecting them to air having a temperature of less than 190° F. and a relative humidity of about 20–40%.
16. A process according to claim 12 wherein the potatoes are cooked by means of air having a relative humidity of less than about 40% and a maximum temperature of about 200° F.

References Cited

UNITED STATES PATENTS

| | | | |
|---|---|---|---|
| 1,299,493 | 4/1919 | Mangelsdorff | 99—207 |
| 2,401,392 | 6/1946 | Ware et al. | 99—100 |
| 2,490,431 | 12/1949 | Greene et al. | 99—207 |
| 2,564,296 | 8/1951 | Bostock | 99—207 |

HYMAN LORD, *Acting Primary Examiner.*

D. M. NAFF, *Assistant Examiner.*